US006170412B1

United States Patent
Memory et al.

(10) Patent No.: US 6,170,412 B1
(45) Date of Patent: Jan. 9, 2001

(54) HYDRAULIC SYSTEM HAVING BOOST PUMP IN PARALLEL WITH A PRIMARY PUMP AND A BOOST PUMP DRIVE THEREFOR

(75) Inventors: Russell J. Memory; Cameron D. Bodie, both of Saskatoon (CA)

(73) Assignee: Flexi-Coil Ltd., Saskatoon (CA)

(*) Notice: Under 35 U.S.C. 154(b), the term of this patent shall be extended for 0 days.

(21) Appl. No.: 09/301,461

(22) Filed: Apr. 29, 1999

Related U.S. Application Data

(60) Provisional application No. 60/083,802, filed on May 1, 1998.

(51) Int. Cl.[7] ........................................... A01C 7/00
(52) U.S. Cl. ........................ 111/174; 111/921; 60/486; 180/53.61; 221/278
(58) Field of Search ........................ 111/170, 174, 111/200, 903, 921, 922; 60/486, 456; 180/53.61, 53.6, 53.4; 172/315; 221/278; 222/251, 252, 333, 334

(56) References Cited

U.S. PATENT DOCUMENTS

| | | | |
|---|---|---|---|
| 3,863,449 | * | 2/1975 | White, Jr. .............................. 60/456 |
| 3,902,566 | * | 9/1975 | Bird .................................. 180/66 F |
| 3,916,625 | * | 11/1975 | Holtkamp .............................. 60/421 |
| 3,992,883 | * | 11/1976 | Cope .................................... 60/456 |
| 4,165,613 | * | 8/1979 | Bernhoft et al. ....................... 60/420 |
| 4,188,790 | * | 2/1980 | Pedersen .............................. 60/483 |
| 4,210,061 | * | 7/1980 | Bianchetta .............................. 91/6 |
| 4,352,406 | | 10/1982 | Fahrenschon ....................... 180/308 |
| 4,383,412 | * | 5/1983 | Presley ................................ 60/430 |
| 4,432,675 | * | 2/1984 | Machnee .............................. 406/30 |
| 4,489,623 | * | 12/1984 | Hakkenberg .......................... 74/378 |
| 4,496,016 | * | 1/1985 | Unsworth et al. .................. 180/53.6 |
| 4,686,828 | * | 8/1987 | Rosman .............................. 60/415 |
| 4,763,487 | * | 8/1988 | Wicks .................................. 62/239 |
| 5,081,837 | * | 1/1992 | Ueno .................................... 60/421 |
| 6,029,445 | * | 2/2000 | Lech .................................... 60/422 |

OTHER PUBLICATIONS

Boggs, *Design News*, PTO–Driven Pump, Jul. 20, 1992.
Morgan et al., *Am. Soc. Agr. Eng.*, Meeting Presentation, Dec. 15, 1992, Paper No. 921604.
Friggstad, *Air Force Seeder*, Product Literature.
Friggstad, *Force V Air Force Seeder*, Product Literature.
Flexi–Coil, *Force V Air Seeder*, Operator's Manual, 1985.
Flexi–Coil, *Force V Air Seeder*, Product Literature.
Ezee–On,*Airseeders*, Product Literature.
Ezee–On, *Model 160 Air Seeder*, Product Literature.
*Prairie Farmer's Catalog.* 1985 and 1990.
Prasco, *Super Seeder Ltd.*

* cited by examiner

*Primary Examiner*—Victor Batson
(74) *Attorney, Agent, or Firm*—Larry W. Miller; J. William Stader

(57) ABSTRACT

A hydraulic system for an aircart having a fan cooperable with an air seeder system to distribute material to the ground utilizes two or more fluid power sources combined in parallel. Total fluid capacity is increased so that one source may have reserve capacity for serving other loads. Flow controls for the system are set so that one source maintains at least a minimum flow to a load when the flow provided by the other source diminishes. Specifically, an aircart fan is operated by fluid power combined from a tractor source and a ground driven pump source with controls being provided to control the fin speed and proportions of flow from each source. The ground driven source (boost pump) boosts available fluid power volume to meet demands of the aircart fan. The boost pump is located near the aircart fan and connected with short lines to minimize power loss in the lines. The boost system shares the tractor components for fluid reservoir, filtering, and cooling so that it does not require its own such components.

20 Claims, 10 Drawing Sheets

REAR VIEW
AIR CART BOOST

SIDE VIEW

HYDRAULIC SYSTEM HAVING BOOST PUMP IN PARALLEL WITH A PRIMARY PUMP AND A BOOST PUMP DRIVE THEREFOR

This application claims the benefit of Provisional No. 60/083,802 filed May 1, 1998.

BACKGROUND OF THE INVENTION

This invention relates to improvements in hydraulic systems for agricultural implements and to control and drive systems for same.

The demand for fluid power from tractors is increasing with the size of implements and with the increased use of hydraulic power on implements. Farm practices are becoming increasingly large and in order to complete seeding and preparations, there are demands for larger air seeding implements. Larger air seeder implements require more hydraulic power for hydraulically driven fans, augers, and other accessories. This demand may be more than the tractor can supply or leaves no reserve capacity to operate implement folding or lifting operations. The hydraulic accessories on the implement may also be a significant distance from the tractor hydraulic power source leading to power losses in long fluid lines and connections.

Separate hydraulic power systems have been used such as ground driven pumps but these have had separate fluid reservoirs, filters, and coolers, making the systems expensive. The Force V air seeder manufactured first by Friggstad Manufacturing and later by Flexi-Coil used a ground driven hydraulic pump to provide fluid power to the air seeder fan. The pump drive was achieved through a planetary gear system. Two pumps driven separately by two ground wheels were used in order to provide enough fluid power to drive the fin motor. Requirements for a fluid reservoir, cooling, filtration and the planetary gear drive added to the expense of the system. Other air seeders have used belts and pulleys to directly drive the fan from the ground wheels.

In all of these prior systems the fan speed was directly dependent on the speed that the implement was towed across the ground Inaccurate metering, delivery, and line plugging were problems with these prior systems.

An improved system used PTO (power take-off) driven pumps to provide fluid power to make up the shortcomings of the tractor hydraulics. ASAE paper 921604 describes such a hydraulic system. However, this is shown to separately provide power to implement actuators and is not shown to be combined with the tractor fluid power, except that the tractor provides a charge pressure to prevent cavitation of the PTO driven pump. The pump is shown to be tied into tractor hydraulics to make combined use of tractor hydraulic filter, reservoir, and cooling systems, but the high pressure fluid power delivered from the PTO pump is not shown to be connected in parallel with the high pressure from the tractor pump to operate implements together. The PTO pump system is sometimes in a location far from where the fluid power is required on an air seeder. Increased line sizes are required to avoid power losses and more connections and setup are required in order to use these systems.

It would be desirable to provide a hydraulic system on the implement which provides the extra power required without giving the operator further work and worry of connecting and setting up systems so they operate satisfactorily without significant loss in performance due to changing ground speeds, and a system which does not duplicate components already available on the tractor, thereby maintaining cost within reason.

A Design News article (issue date: Feb. 20, 1992), titled "PTO Driven Pump Augments Tractor Hydraulics" shows an auxiliary pump driven from a PTO drive and operating an implement motor. This circuit shows the tractor provides a charge pressure to the auxiliary pump limited by a relief shown on the tractor return line. The pressure available to the motor is not the combination of the tractor with the auxiliary pump but only the difference between the pressure provided by the auxiliary pump and the charge pressure because the charge pressure is also seen by the return side of the implement motor.

SUMMARY OF THE INVENTION

In accordance with one aspect the invention provides a hydraulic drive system adapted to be connected to a primary or main source of hydraulic power including a main pump and a reservoir; said hydraulic drive system comprising:

a hydraulic motor for driving a load, a high pressure supply line connected to an inlet of said hydraulic motor and a low pressure return line connected to an outlet of said hydraulic motor, said supply and return lines adapted to be connected to output and return ports respectively of said main source, and a boost pump having an outlet and an inlet in communication with said supply and return lines respectively such that when said drive system is connected to said main source said boost pump is in parallel with said main pump, and a drive for said boost pump whereby in use the output of said boost pump complements the output of the main pump to assist in delivering fluid to said hydraulic motor sufficient as to help in maintaining a desired speed thereof.

The present invention thus includes a hydraulic system that combines fluid power from an auxiliary source (including a boost pump) with a tractor hydraulic power source for increased power capacity. This novel system does so without additional filtering, cooling, or reservoir components by making use of the tractor components. There have been other auxiliary systems that make use of tractor hydraulic system components but these have not shown a combining of power sources to operate implements. Applicants' system also typically includes a flow control which the operator adjusts to control the boost flow portion being added to drive the fan and to control aircart fan speed.

The present invention thus provides, in one aspect, a parallel circuit arrangement having features not shown in the auxiliary rangement noted above. In applicants' circuit, the tractor maintains a base flow rate, even when the boost pump is not operating. Also, the boost pump circulates flow within a part of the circuit and all the flow to the motor does not circulate back to the tractor, reducing line size requirements and losses. The flow requirement is shared between the boost pump and the tractor.

Other features of this aspect of the invention include:

a means to couple two or more fluid power sources with controls to adjust the flow volume being delivered to the loads and/or control the proportion of volume from each source;

a means to couple two or more fluid sources to a load whereby at least one source maintains a minimum of volume to the load(s) for minimum operation;

a hydraulic circuit for combining fluid power from a ground driven pump with that from the tractor to power hydraulic circuits on an implement, particularly power for an air seeder fin.

In accordance with another aspect of the invention there is provided an agricultural machine having a hydraulic drive system adapted to be connected to a primary or main source of hydraulic power including a main pump and a reservoir, wherein said hydraulic drive system includes a hydraulic motor for driving a load, a high pressure supply line connected to an inlet of said hydraulic motor and a low pressure return line connected to an outlet of said hydraulic motor, said supply and return lines adapted to be connected to output and return ports respectively of said main source, a boost pump for complementing/supplementing the output of the main pump when in use and a drive for said boost pump including a ground engaging wheel connected via a mechanical drive train to said boost pump whereby said boost pump is driven at speeds dependent on the ground speed of the agricultural machine.

This aspect of the invention typically includes an improved pump drive including a ground drive mounting arrangement having a geometry which results in a self-engaging reaction between a drive sprocket and a drive chain which s operating wear and provides optimum life of the chain and sprocket drive components to drive the hydraulic boost pump. By properly selecting sprocket drive sizes, hydraulic pump size, drive speed, and flow control, the allowable system forces created enable the ground driven boost pump to provide high pressure hydraulic fluid which is combined with tractor hydraulic fluid to operate equipment such as an aircart fan.

In the specific example given above the aircart may include a boost pump driven by each of the aircart wheels with both/all being connected in parallel with the tractor hydraulic pump.

DETAILED DESCRIPTION OF PREFERRED EMBODIMENTS

Figure 1:
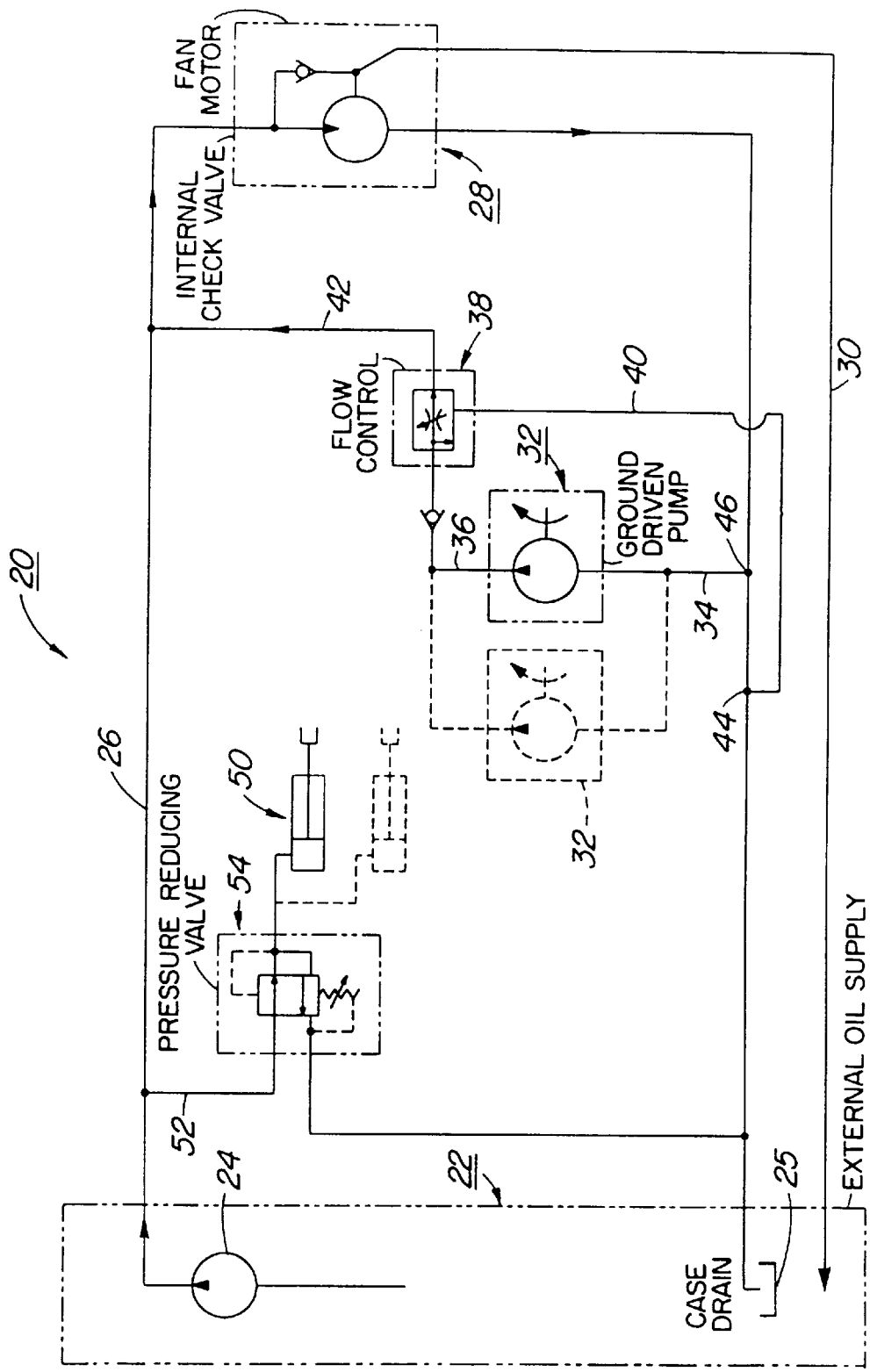
FIG. 1 is a hydraulic circuit diagram of the boost system in accordance with one aspect of the invention.

FIG. 1 shows a preferred form of boost system hydraulic circuit 20. Hydraulic circuit 20 is connected to a tractor main hydraulic power source 22 which includes a main pump 24, a reservoir 25 and other components to be noted hereafter. A high pressure supply line 26 extends from the output port of main source 22 to the inlet port of a rotary hydraulic motor 28 which drives an aircart fan. A low pressure return line 30 extends from the outlet port of motor 28 to the return port and reservoir of main source 22.

A boost pump 32 is connected between the supply and return lines 20, 30 in parallel with the main source 22. The inlet port of boost pump 32 is connected to return line 30 by way of pump inlet line 34. The high pressure output side of boost pump 32 is connected to supply line 26 via pump output line 36 which leads into a boost flow control in the form of a pressure compensated adjustable flow control valve 38, the latter having one outlet connected to a bypass line 40 connected to the return line 30, and another outlet connected to the boost flow line 42 which connects to supply line 26. Regardless of reasonable variations in boost pump speed, the flow control 38 can be operated to provide the desired amount of boost flow into supply line 26 with any excess flow moving via bypass line 40 into the return line 30 whereby to provide the desired flow to the fan motor 28 and the desired motor speed A check valve 37 in output line 36 prevents the main source 22 from driving the boost pump 32 in reverse when it is not engaged but with the main source operating.

It will be noted that by-pass flow from the flow control 38 enters the return line 30 from by-pass line 40 at the by-pass connection 44 which is downstream of the connection 46 between the boost pump inlet line 34 and return line 30 in terms of flow direction in the return line. This reduces the amount of fluid which circulates in the "boost portion" of the circuit without being returned to the main source 22 for cooling, filtering etc., i.e. it ensures that a reasonable flow is returned for cooling, filtering etc. at all times.

Although the mechanical drive for the boost pump 32 will be described hereafter, mention is made here of single-acting hydraulic ram 50, the inlet of which is connected to main supply line 26 via ram supply line 52 in which is disposed a pressure reducing valve 54. Ram 50 is connected to engage the boost pump with its drive when the main (tractor) hydraulic source 22 is energized.

Figure 2:
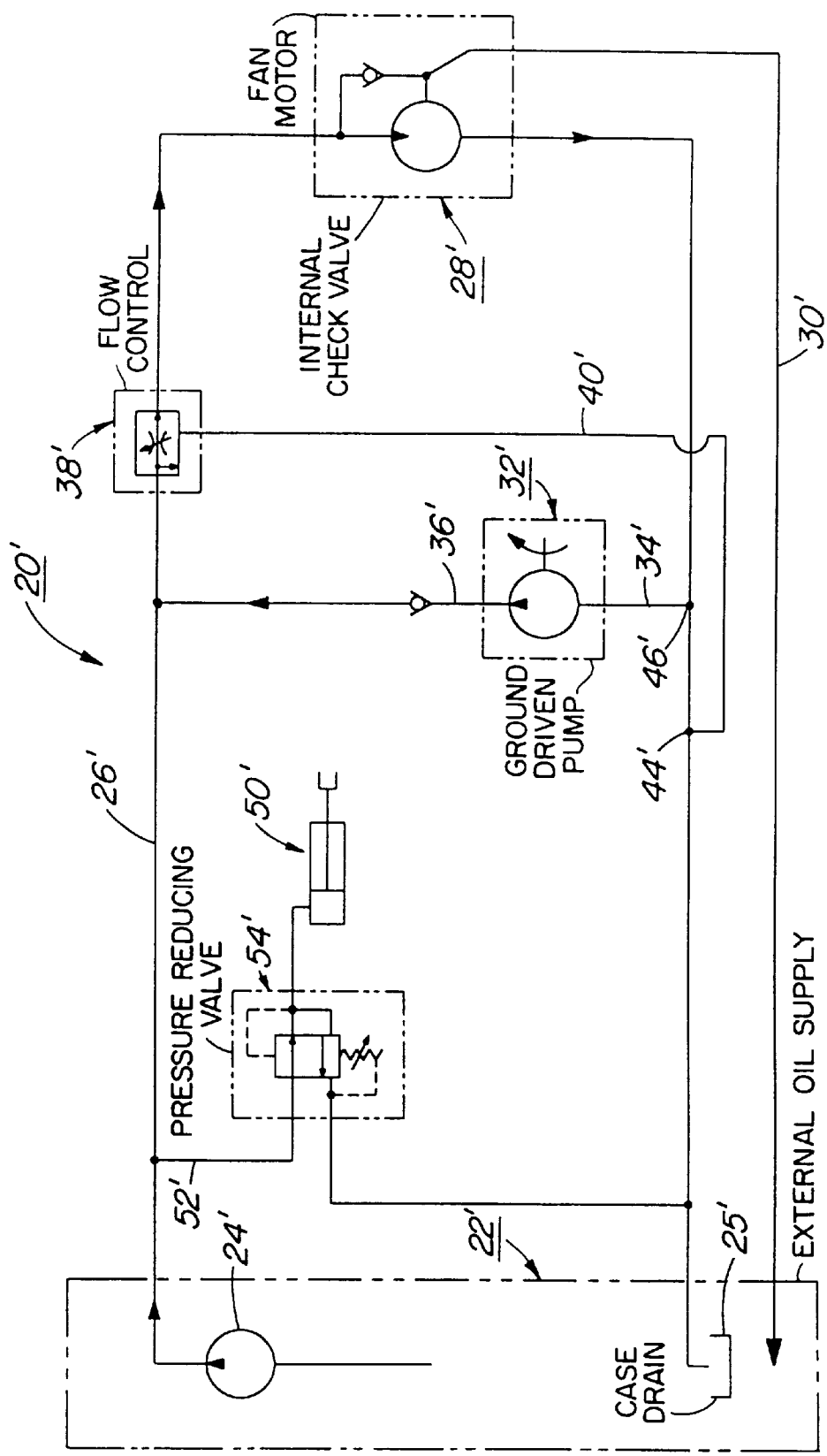
FIG. 2 is a diagram similar to that of FIG. 1 showing an alternative circuit configuration.

An alternative form of hydraulic circuit is shown in FIG. 2 wherein reference numbers 20_, 22_, 24_, 26_ etc. represent the same components 20, 22, 24, 26 described with reference to FIG. 1. The only difference between the two circuits is that the pressure compensated flow control 38_ is positioned directly in the supply line 26_ downstream of the point where flow from boost pump 32_ enters line 26_ via pump output line 36_. By pass line 40_ returns flow not required by fan motor 28_ to the return line 30_ as before.

Figure 2A:
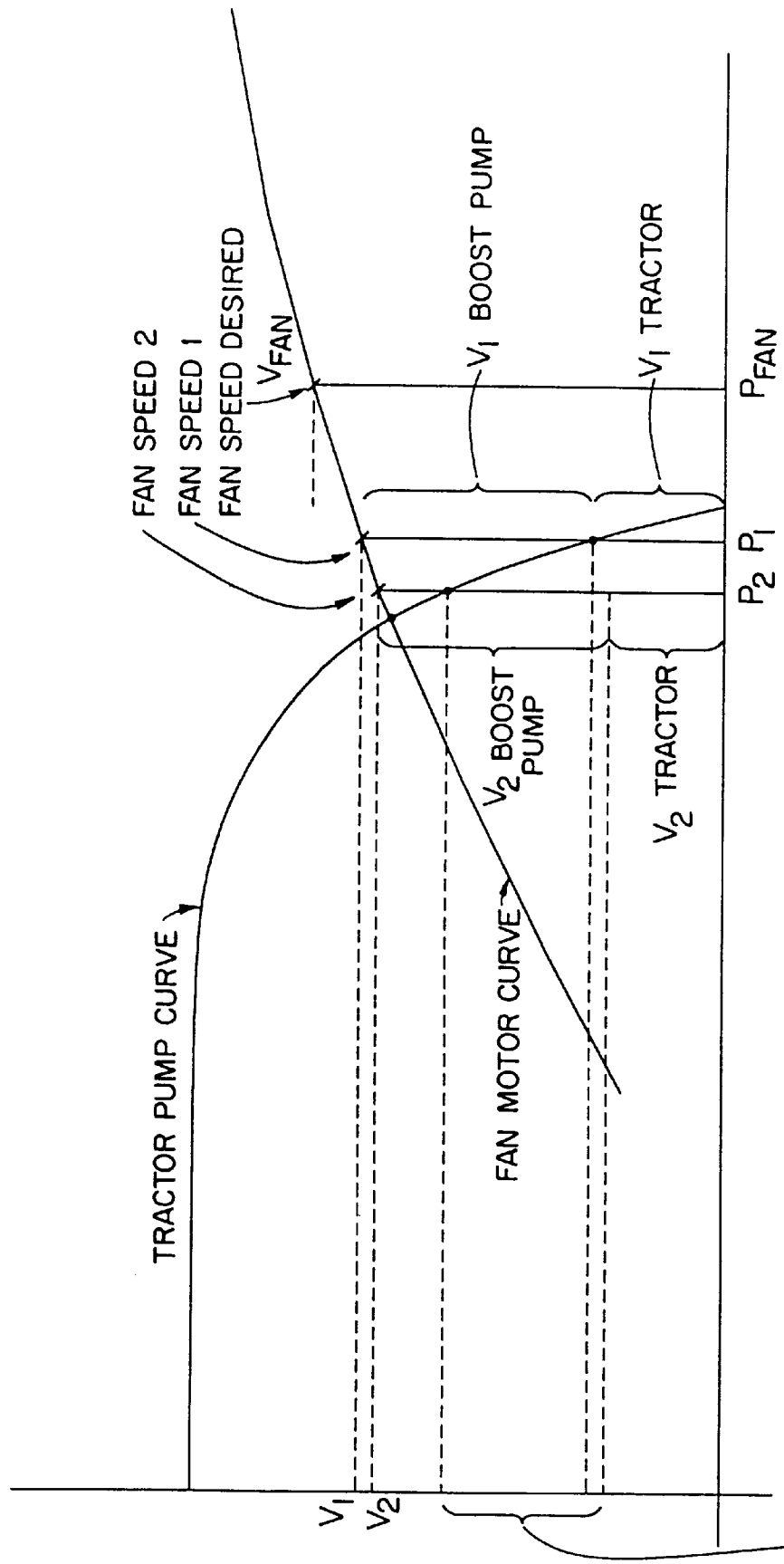
FIG. 2A is a chart of a tractor hydraulic pump and aircart fan motor pressure-volume operating curve for the parallel system described herein.

FIG. 2A demonstrates an advantage which can be gained by the boost pump parallel circuit described above. The aircart fan motor 28 cannot be operated at a pressure higher than what the tractor system can provide. The aircart fin speed is therefor limited by the speed attained by the tractor system pressure. The boost pump parallel circuit however does provide an advantage in reducing the portion of fan operating flow which is provided by the tractor, leaving the tractor system with some reserve flow capacity to operate other implement circuits. The chart shows that the desired fan speed requiring flow Vfan and Pfan is unattainable. Fan speed V1 is attainable if the tractor operates to produce its maximum pressure with the boost pump also operating to provide flow in parallel. Fan speed can be maintained at speed V2 if some tractor volume is required for operating other circuits and if the boost pump 32 is operated.

Now that the hydraulic circuit of FIG. 1 has been described in general terms, some of the major components of same will be described in further detail, beginning with the main source 22.

Main Source (22)

The main hydraulic power source 22, as noted above, is provided by the tractor. This includes a fluid reservoir, filter, pump, tractor flow controls, and provides for the dissipation heat from the hydraulic fluid. These components (all well known per se) do not need to be duplicated in the boost system which is connected to the tractor system to obtain that advantage. The main source 22 also provides for addition control of the speed of fan motor 28 and maintains a base speed when the various implements are not in motion.

Boost Pump (38)

The boost pump 38 is a pump such as an Eaton Model 2000 series disc valve geroler-type having a displacement of 18.7 cubic inches/rev. with a pressure rating of 3000 psi continuous. To eliminate cavitation problems the fluid supply pressure at the inlet side of the boost pump 38 is maintained at a minimum of about 50 psi. This pressure results from resistance in the lines returning to the (tractor) main power source 22 which are intentionally selected (sized) in order to maintain this approximate return side pressure.

The boost pump 38 is driven by an aircart ground wheel via a mechanical drive to be described hereafter with reference to FIGS. 4–10. One or more boost pumps may be connected in parallel (a second pump 32 is shown in phantom in FIG. 1), each driven by separate aircart ground engaging wheels, to provide adequate boost flow. By having pumps connected to two aircart wheels on either side of the aircart one could minimize variation in total boost pump flow as when the aircart travels in a turn in which the wheel on the inside of the turn has reduced rotational speed.

The boost pump may, alternatively, be driven by a tractor power take off (PTO) drive (not shown).

Boost Flow Control (38)

The pressure compensated flow control valve 38, as noted above, is used to control the boost pump flow which is directed to the fan motor 28. The flow control 38 is set to give the desired fan speed and any excess flow (flow not needed to maintain fan speed) from the boost pump 32 is diverted to the system return line 30 by the flow control. A preferred boost flow control valve is supplied by Brand Hydraulics Model FCR-55-NO. The flow control 38 has an adjustment lever which can be set manually or, as an option, can be adjusted by an actuator controlled from the tractor cab to set the maximum amount of boost flow that will be directed to the fan motor 28 via lines 42 and 26. In this way the operator can control the aircart fan speed "on the go". The aircart fan speed is sensed and indicated in the tractor cab by conventional means (not shown) to provide information to the operator for adjusting the flow controls.

The tractor main source 22 supply is typically controlled by a relief valve set at 2300–2900 psi so the fan motor speed is limited at the point where the fan drive load requires 2300–2900 psi. Any excess boost flow beyond these levels would be relieved through the usual main source tractor relief(not shown).

Return from the boost flow control 38, as noted previously, is connected to the return line 30 at a point 44 downstream of the boost pump intake 46 to ensure the boost system returns some fluid back to the tractor for cooling and filtering.

Figure 3:
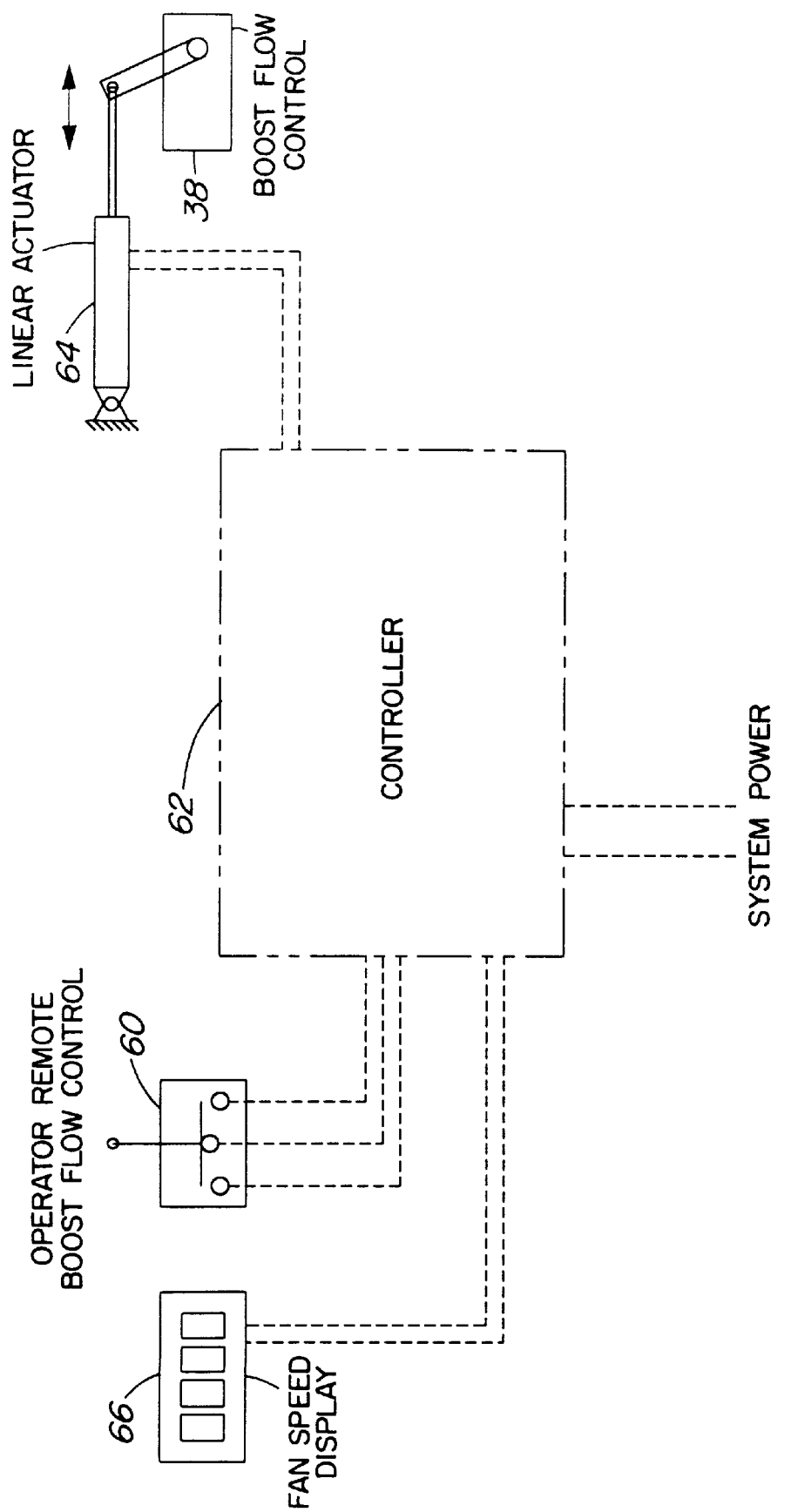
FIG. 3 is a schematic diagram of a control system for the hydraulic circuit.

FIG. 3 shows the optional remote control system which allows the operator to make boost flow adjustments from a remote location such as a tractor cab. A three-way switch 60 feeds control signals to controller 62 which has an output connected to linear actuator 64. This in turn moves the control lever of the boost flow control 38 as described previously. Fan speed display 66 coupled with the operator's knowledge of the type and size of equipment and the nature of the operation, e.g. seeding and/or fertilizing, enables the correct setting to be made.

Operator Steps

1. The operator sets the boost flow control 38 to about the ¾ of full flow position.

2. The operator engages the tractor hydraulics (main source 24) which causes operation of the aircart fin motor 28 at a base speed and also provides pressure to engage the boost pump drive via hydraulic ram 50 as will be described hereafter.

3. The Operator puts the tractor in motion to attain operating ground speed and then fine tunes the aircart fan speed by one of the following methods:

a. adjusts the boost flow control via switch 60 to set the fan speed;

b. adjusts the tractor (main source) hydraulic flow rate to set the fan speed (this may affect the base rate);

c. adjust both the tractor controls and boost flow control 38 to obtain the desired proportion of boost flow and tractor (main source) flow which flow combination operates the fan at the desired speed.

(Methods 3(a) and (c) are available only when the remote control system of FIG. 3 is provided to allow the operator to adjust the boost flow control from the tractor cab.)

System Operation

The system is set up for first use by the operator setting the boost flow control 38 and tractor flow control to what is believed to produce the desired balance of flow control with the intent being to maximize use of the boost system and minimize flow from the tractor (main source) hydraulics so that the tractor system has reserve flow capacity to perform other functions. It is usually desired to have the tractor hydraulics provide at least enough flow to maintain a base fan speed when the aircart is not in motion (i.e. enough airflow to prevent delivery tube blockage). An initial boost flow control setting at the ¾ position is recommenced.

It is preferred to start the aircart fan operation by engaging the tractor hydraulics before putting the implements into motion to minimize shock to the boost drive and extend its life. The boost engaging ram 50 is charged and engages the boost pump mechanical drive when the tractor hydraulics are engaged. The fan begins operating at the base fan speed which is controlled by the tractor flow control.

When the aircart is put in motion, an aircart ground wheel drives the boost pump 32 via a chain and sprocket drive connection to be described hereafter. At operating ground speed, the boost pump 32 increases the volume of fluid power delivered to the aircart fan. The boost pump receives some of the fluid returning via line 30 from the fan, boosts the pressure up to high operating pressure, and delivers it to the flow control 38. The boost pump speed varies directly with the speed of travel of the equipment over the ground, i.e. the speed, the aircart wheel is rotating. However the pressure compensated boost flow control valve 38 directs a constant amount of flow from the boost pump 32 to the fan provided the boost pump is producing at least the amount for which the control is set. This amount may be adjusted during operation as described above. Excess flow is bypassed back into the system return line 30 at a location 44 where it does not re-enter the boost pump 32 so it is ensured that some portion of the fluid circulating in the boost section of the circuit is passed back to the tractor hydraulic system for cooling and filtering.

The flow control adjustment lever is set manually or can be adjusted by an actuator controlled from the tractor cab to set the maximum amount of boost flow that will be directed to the fan. In this way the operator can control the air seeder fan speed on the go.

Aircart fan speed may be adjusted during operation by either adjusting the tractor flow control, boost flow control or both. The boost flow control may include a remote adjustment system so it may be controlled from within the tractor cab. Fan speed is sensed and indicated in the tractor cab to provide the operator information to adjust the controls.

Typically the aircart fan is operated between 2000 and 5500 rpm. This requires a flow range of about 5 to 18 gpm as determined by the size of the fan motor 28. The load of the fan is such that the fan drive requires about 2000–2300 psi pressure at 18 gpm at 5500 rpm. At 5500 rpm the boost pump may contribute about 8 gpm and the balance (10 gpm) is provided by the tractor hydraulics. If the implement speed is reduced such that the ground driven boost pump begins to produce less than 8 gpm, then the tractor hydraulic system flow may increase in response, depending on whether the tractor hydraulic system has open center, or pressure compensated closed center pump control and depending on the tractor flow control and depending on what the operating point is with respect to the tractor pump output curve. When the implements are not in motion the tractor hydraulics may produce about 10 gpm to maintain the base in speed.

Figure 4:
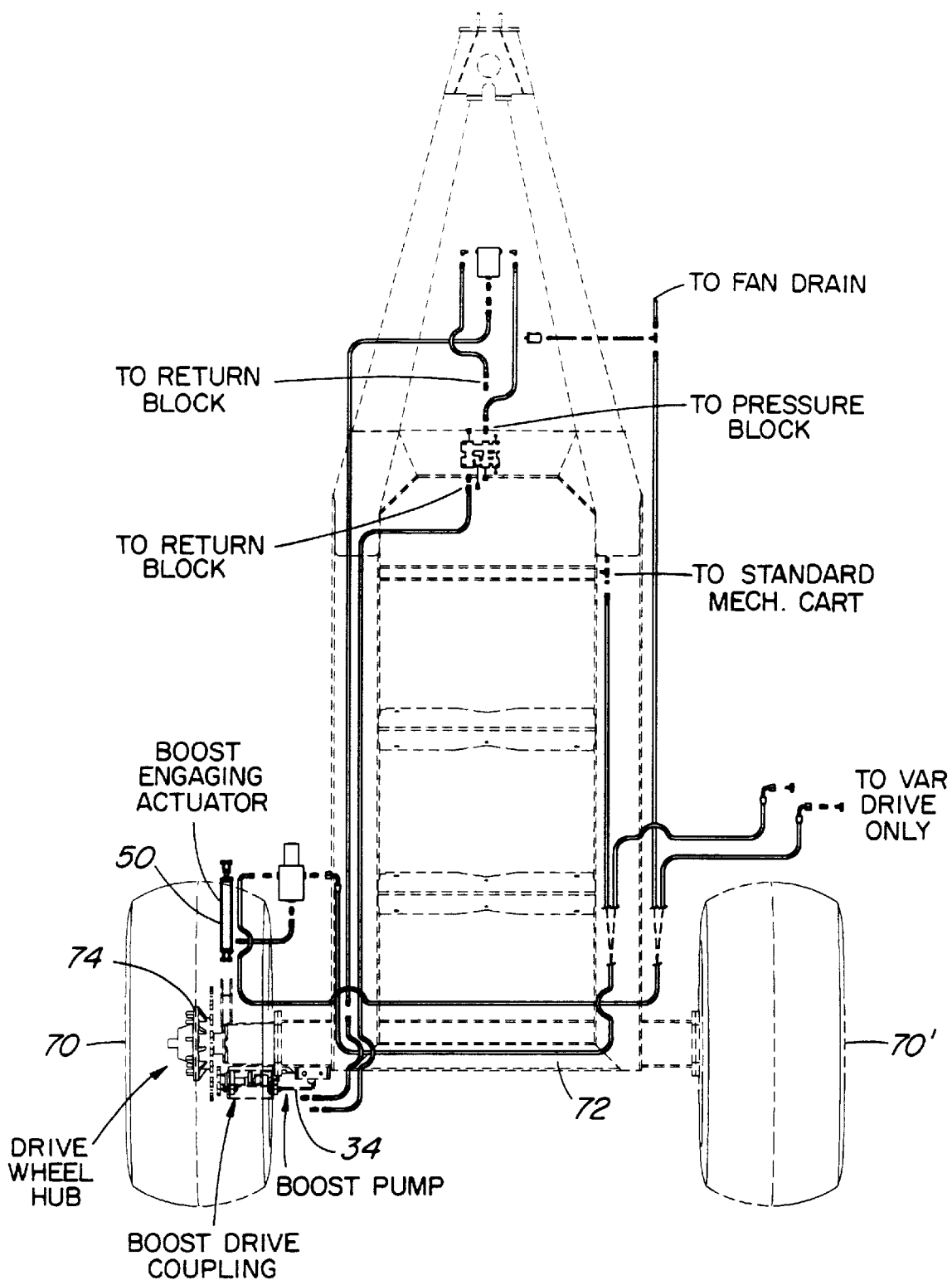
FIG. 4 shows portions of the hydraulic circuit and boost pump ground drive superimposed on an outline of an aircart frame.
Figure 5:
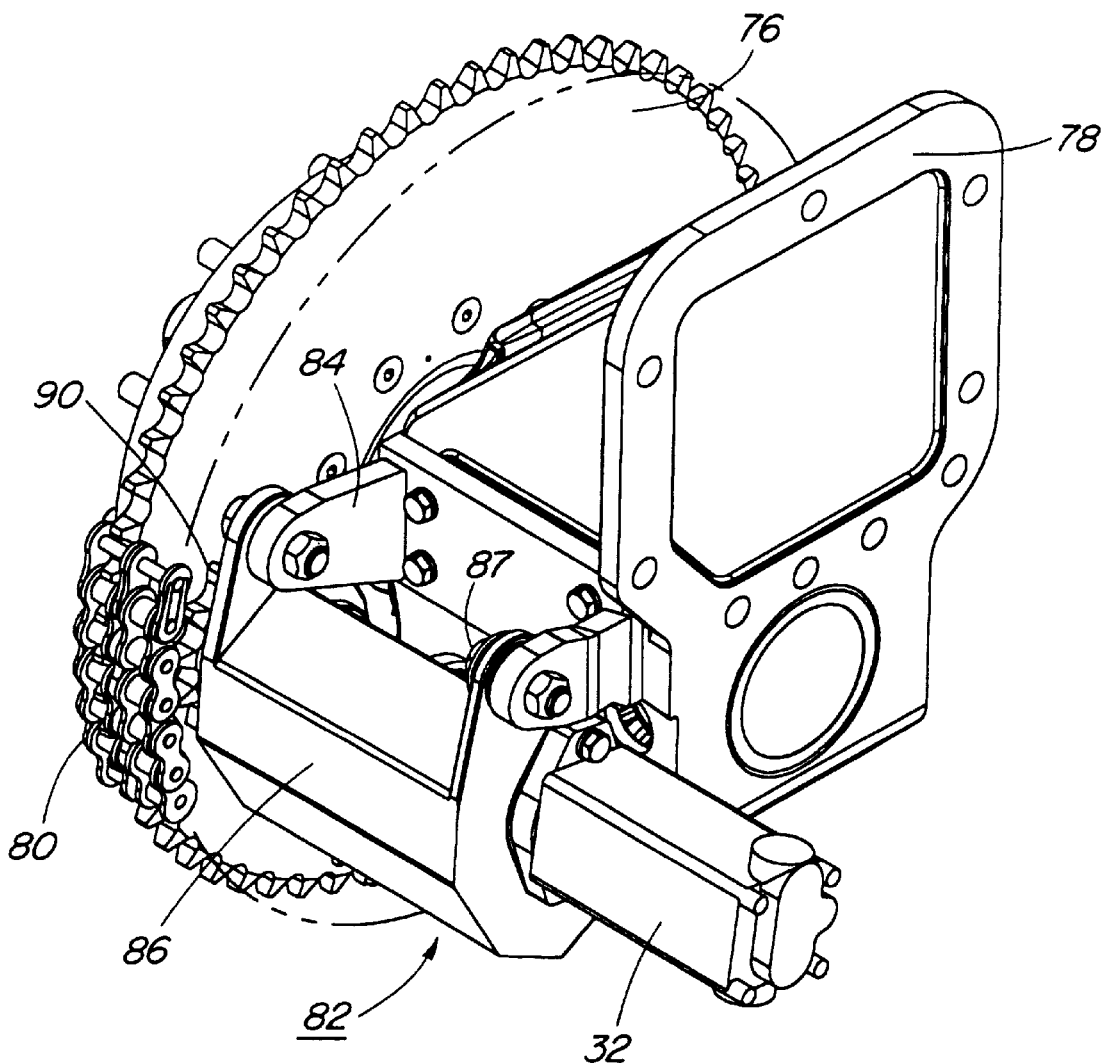
FIG. 5 is a perspective view of the boost pump and its mechanical drive assembly.
Figure 6:
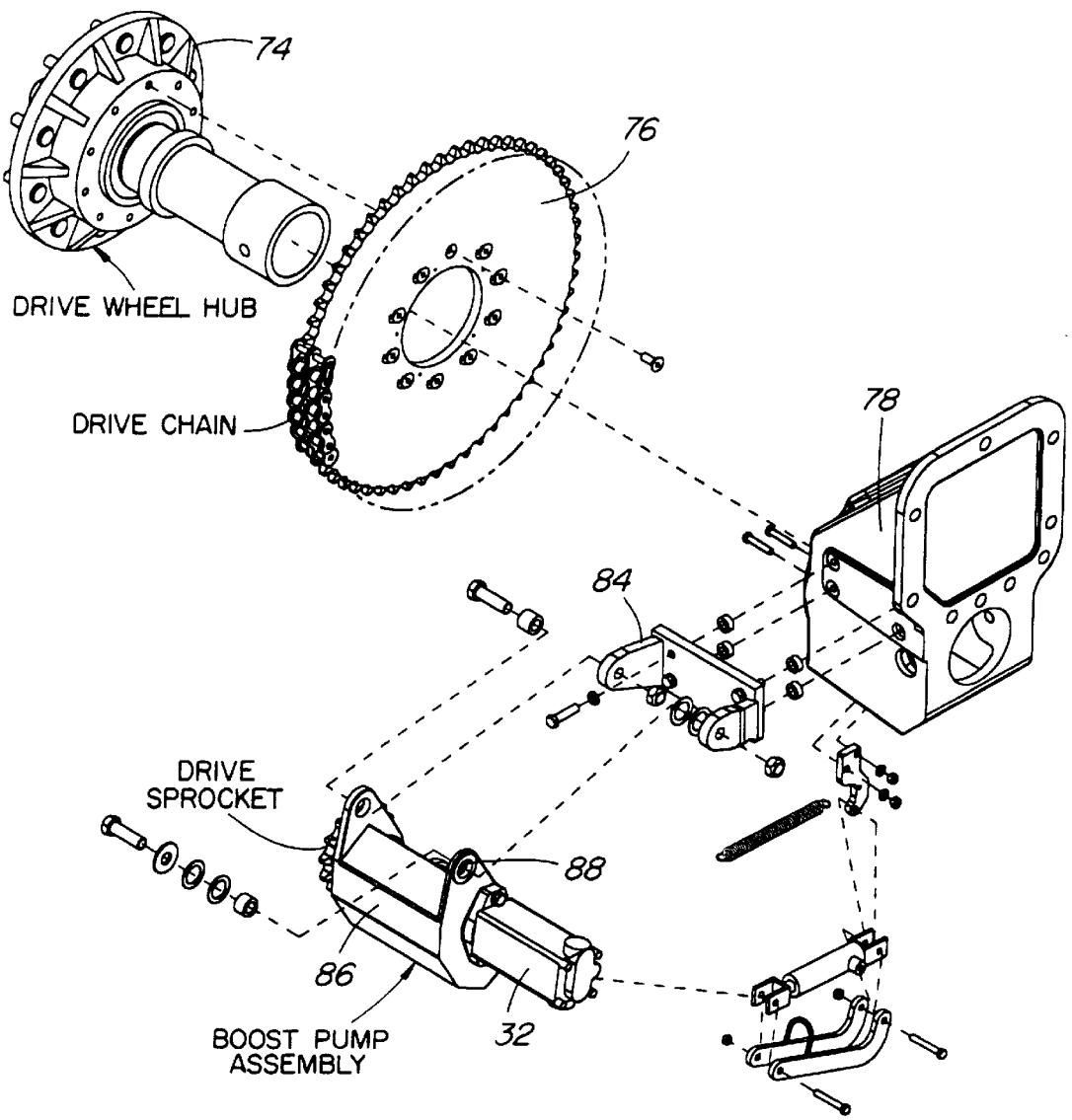
FIG. 6 is an exploded view of the boost pump and drive assembly shown in FIG. 5.

Reference will now be had to FIGS. 4–10 which illustrate the mechanical drive for the boost pump 32. In FIG. 4, a portion of an aircart is shown in phantom with certain of the hydraulic lines. An aircart ground engaging wheel 70 is mounted to axle 72 via wheel hub 74 (FIGS. 5 and 6) and a primary drive sprocket 76 is fixed to wheel hub 74. Axle 72 is journalled in support housing 78 which is bolted to the aircart frame. A dual race roller drive chain 80 is attached snugly around the perimeter of primary sprocket 76 so that the second race extends inwardly from the inner face of sprocket 76 (FIGS. 5 and 6).

A boost pump 32 and its carrier assembly 82 are pivotally mounted to housing 78 by way of a pivot mount 84 fixed to housing 78 and bolted via pivot bolts 87 to upstanding pivot lugs 88 on the boost pump carrier housing 86.

Figure 7:
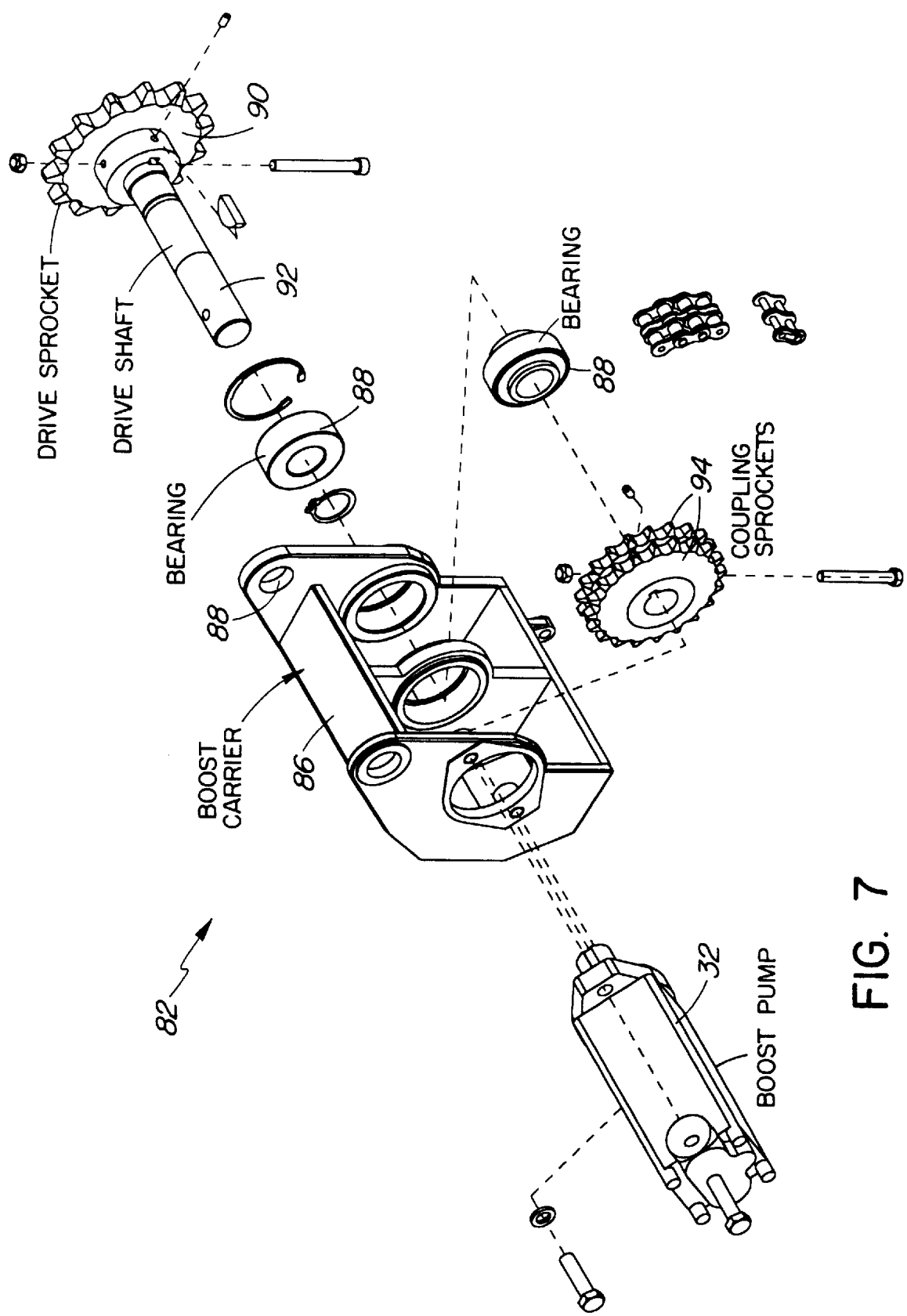
FIG. 7 is an exploded view of the boost pump mounting assembly and drive coupling.

Referring to FIG. 7, the boost pump 32 is mounted in one end of carrier housing 86 and serves to rotate a pump drive sprocket 90 mounted at the opposing end of housing 86 via drive shaft 92 journalled in housing 86 by bearings 88 and via coupling sprockets 94.

Figure 9:
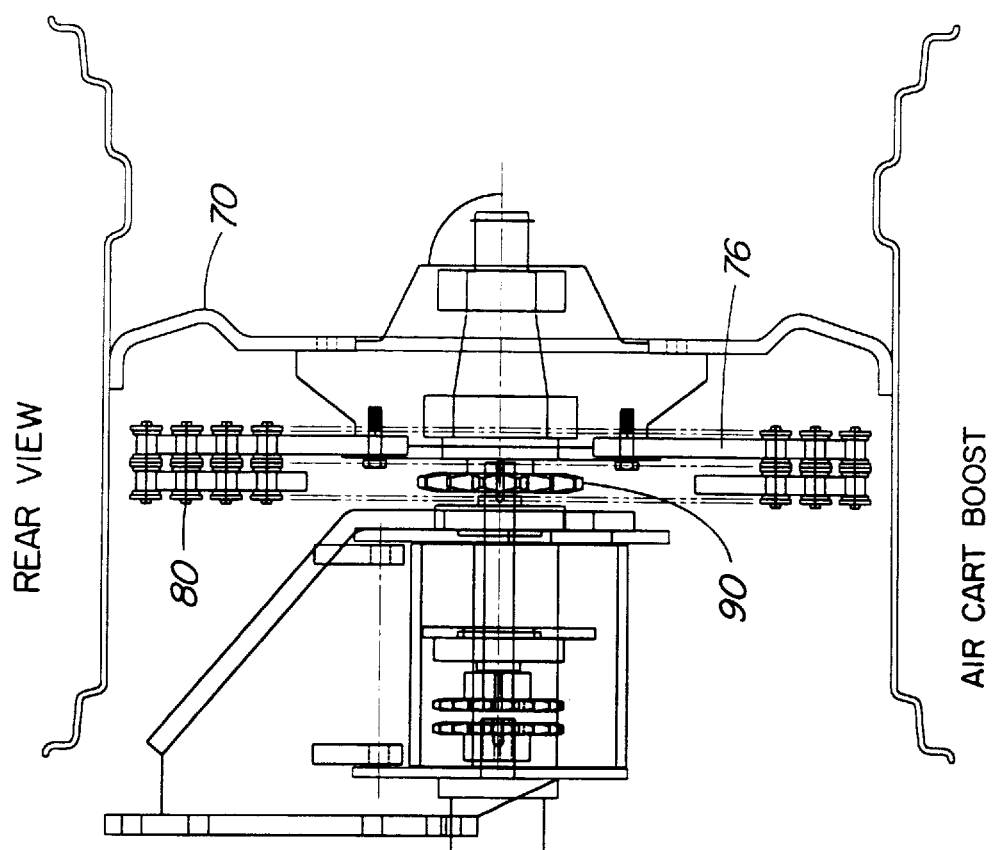
FIGS. 8 and 9 are side and rear elevation views of the boost pump and its mechanical drive assembly.
Figure 8:
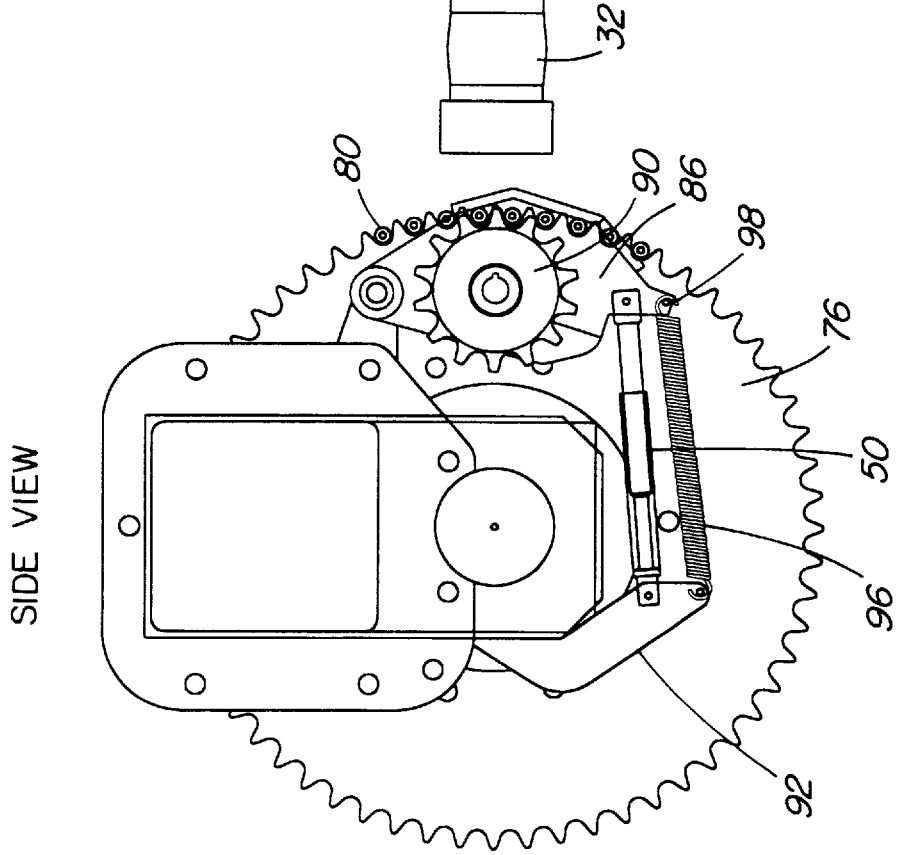
Figure 10:
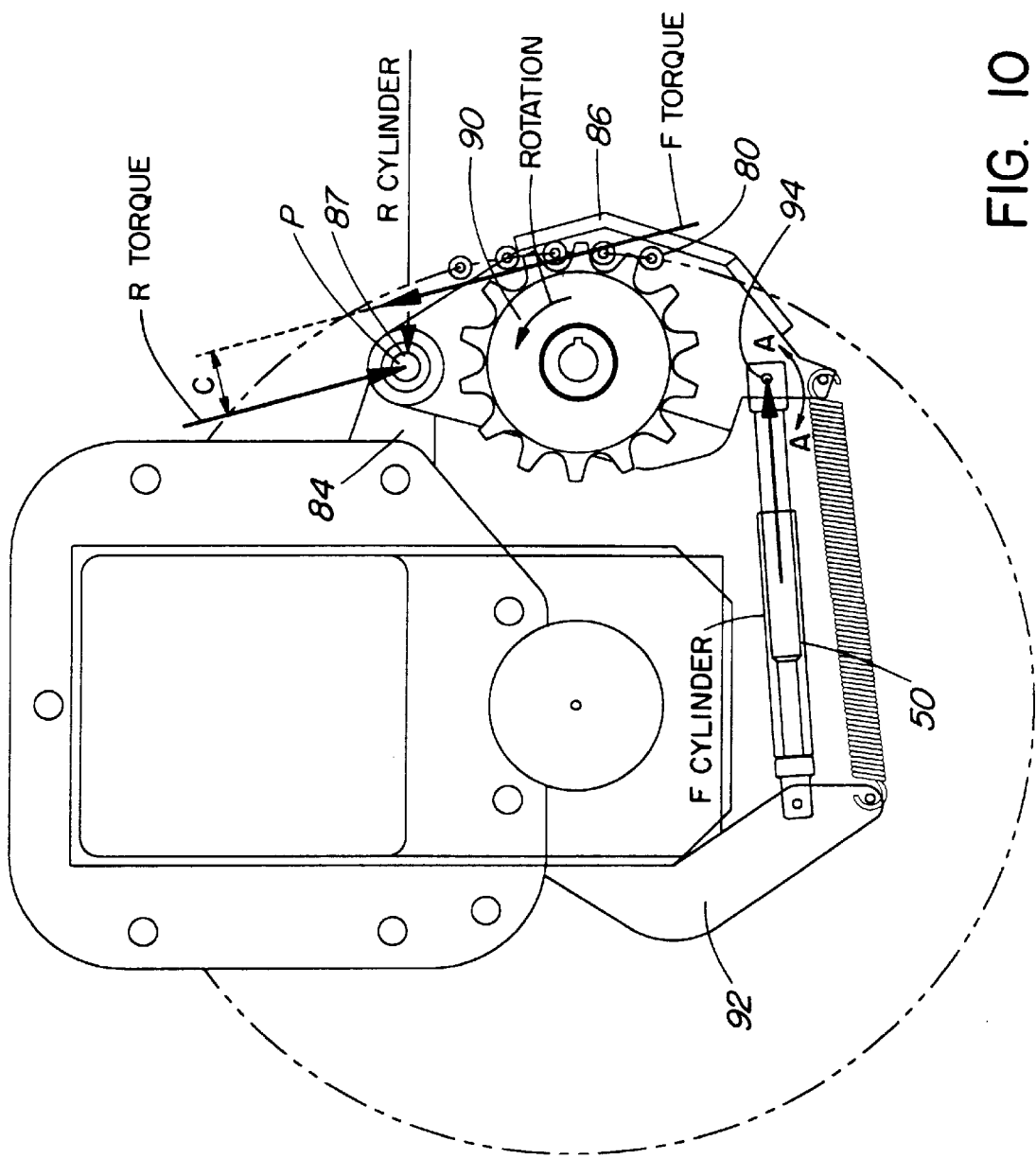
FIG. 10 is a side elevation view of the boost pump drive sprocket and associated assemblies showing the forces exerted by and on it during use.

The smaller boost pump drive sprocket 90 engages with the second race of the drive chain 80 trained around primary sprocket 76 on the inside of the base circle defined by the drive chain 80 (FIGS. 8–10). In order to provide for engagement between the pump drive sprocket 90 and the drive chain 80 on the primary sprocket, an actuating device is provided in the form of the aforementioned hydraulic ram 50 which is connected to the hydraulic circuit described above with reference to FIG. 1. Referring to FIG. 10, the hydraulic ram 50 is interconnected between bracket 92 fixed to housing 78 and a pivot point 94 on a lower extremity of boost carrier housing 86. Hence as hydraulic ram 50 extends and retracts, carrier housing 86 rotates back and forth about the pivot bolts 87 (pivot P) in the direction of arrows A—A thus bringing drive sprocket 90 toward and away from the drive chain 80.

Since ram 50 is a single acting ram, a coil tension spring 96 (FIG. 8) is also connected between fixed bracket 92 and the further point 98 on the lower extremity of boost carrier housing 86. Thus, when the hydraulic pressure in the system drops, the spring 96 rotates the boost carrier housing 86 clockwise as seen in FIG. 10 bringing boost pump drive sprocket 90 away from the drive chain 80. When the tractor hydraulics are engaged (see operator step 2 above) the hydraulic pressure extends ram 50 thus bringing sprocket 90 into engagement with the drive chain 80 to rotate the boost pump 32 once the operator puts the tractor and the aircart which it is towing into motion. A "clutching" action is thus provided by the drive system described above. The drive is engaged when the tractor hydraulic system supplies pressure to ram 50 and vice versa. The maximum force exerted by ram 50 is of course determined by the setting of the pressure reducing valve 54.

A key to the boost systems' ability to operate at the proper pressures and flow rates is the selection of size and operating speed of the boost pump 32. Limits to the choices of drive sprocket combinations between the aircart wheel and the pump including the need to drive the boost pump at the required speeds result in high torque forces in driving the booster pump 32 at the design conditions. The resulting forces can cause high wear in the pump drive component, e.g. sprocket 90 and drive chain 80, and the forces cause the pump drive sprocket 90 to be repelled by the drive chain 80. The pivot mount of the boost pump carrier housing 86 has been positioned to alleviate these problems so that a self-engaging force results to oppose the repelling force.

The pump drive sprocket 90 is then held in engagement with the drive chain 80 with a relatively smaller force from the pump drive activating ram 50. This action is best illustrated in FIG. 10 which shows a side view of the boost pump drive sprocket 90 with the torque force vector F torque offset a distance "C" from the reaction torque vector R torque passing through the pivot P defined by pivot bolts 87. A reaction couple is thus produced about pivot P in a direction which assists the pump drive sprocket 90's engagement with the drive chain 80, and in the same direction as shown by force vector F cylinder. This self engaging reaction between the pump drive sprocket 90 and drive chain 80 minimizes operating wear and provides optimum life of the chain and sprocket drive components.

It is seen from the above that the forces which maintain the pump drive sprocket 90 in engagement with chain 80 vary with the drive torque being transmitted so there is little excessive force which would otherwise contribute to weaning of the drive components leading to failure. The life of the drive is extended by the design of the drive because the drive engaging forces are no larger than needed at any time. This is further described below.

The pump drive sprocket 90 is placed in and out of engagement with drive chain 80 by operation of the hydraulic ram 50. However, the ram 50 typically contributes only a minor part of the force necessary to maintain the drive engagement when the drive is operating under maximum load. The majority of the force to maintain the engagement is a resultant of the reaction on the drive carrier housing 86. The pivotal connection of the drive carrier housing 87 is located such that the reaction from the driving forces on the sprocket 90 causes a moment force on the carrier housing 86 to maintain the drive engagement. The new design provides for the engaging force to be contributed in 2 parts, i.e. part from the hydraulic ram 50 and part from the moment reaction on the carrier housing 86. The moment reaction is due to the carrier pivot 87 being located a distance "C" offset from the directional vector F torque which acts on the sprocket as described above.

When the drive is operating at less than peak load, the driving forces are decreased, the reaction is equally decreased and the moment engaging force is decreased. The design thus provides reduced drive engaging forces at off-peak loads so that the drive components wear at a reduced rate, thus extending the life of the boost pump drive.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention, which have been described by way of example; however, other concepts may be employed in other embodiments without departing from the scope of the invention. Those skilled in the art will realize that various modifications and changes may be made while remaining within the spirit and scope of the invention. Hence the invention is not to be limited to the embodiments as described but, rather, the invention encompasses the full range of equivalencies as defined by the appended claims.

Having thus described the invention, what is claimed is:

1. A hydraulic drive system for an agricultural implement adapted to be connected to a prime mover having a main source of hydraulic power including a main pump and a reservoir, comprising:
    a hydraulic motor for driving a load, a high pressure supply line connected to an inlet of said hydraulic motor and a low pressure return line connected to an outlet of said hydraulic motor, said supply and return lines adapted to be connected to output and return ports respectively of said main source;
    a boost pump having an outlet and an inlet in communication with said supply and return lines respectively such that when said drive system is connected to said main source said boost pump is in parallel with said main pump;
    a drive for said boost pump whereby in use the output of said boost pump complements the output of the main pump to assist in delivering fluid to said hydraulic motor sufficient as to help in maintaining a desired speed thereof; and
    fluid control means disposed between the outlet of said boost pump and the inlet of the hydraulic motor to further assist in maintaining the desired speed of said hydraulic motor, said fluid control means is operable to control the proportions of the flow volume delivered to said hydraulic motor from each of said main pump and said boost pump.

2. The hydraulic drive system of claim 1, wherein said fluid control means comprises a pressure compensated adjustable flow control disposed between the outlet of said boost pump and the inlet of said hydraulic motor.

3. The hydraulic drive system of claim 2 wherein said adjustable flow control has a by-pass line connected thereto and to said return lie whereby hydraulic flow in excess of that needed to maintain the speed of said hydraulic motor is returned to said return line.

4. The hydraulic drive system of claim 3 wherein said boost pump is connected to said supply and return lines via boost pump output and et lines respectively, said adjustable flow control being located in said boost pump output line.

5. The hydraulic drive system of claim 4 wherein said by-pass line is connected to said return line downstream of a point at which said boost pump inlet line is connected to said return line to ensure that a portion of the total flow is returned to said main source for cooling or filtering.

6. The hydraulic drive system of claim 3 wherein said boost pump is connected to said supply and return lines via boost pump output and input lines respectively, said adjustable flow control being located in said supply line downstream of a point at which said boost pump output line is connected to said supply line.

7. The hydraulic drive system of claim 6 wherein said by-pass line is connected to said return line downstream of a point at which said boost pump inlet line is connected to said return line to ensure that a portion of the total flow is returned to said main source for cooling and/or filtering.

8. The hydraulic drive system of claim 7 wherein said drive for said boost pump includes a ground engaging wheel connected via a mechanical drive train to said boost pump whereby said boost pump is driven at speeds dependent on a ground speed of the agricultural implement.

9. The hydraulic drive system of claim 8 wherein a pair of said boost pumps are disposed in parallel, each boost pump connected to a respective ground engaging wheel located at opposing sides of the machine whereby to reduce total boost pump flow variation as when the agricultural implement travels in a turn.

10. The hydraulic drive system of claim 8 wherein said mechanical drive train includes a pump drive sprocket connected to said boost pump and drive means engaging said sprocket to effect rotation of same on rotation of said ground engaging wheel, and further means for providing variable drive engaging forces to prevent slippage of said drive means relative to said sprocket, which drive engaging forces are reduced during off-peak loads to reduce wear between said sprocket and said drive means.

11. The hydraulic drive system of claim 10 wherein said further means for providing variable drive engaging forces include a pivotal mounting for said boost pump arranged and located such that torque-producing forces exerted on said sprocket by said drive means create moment forces on said boost pump tending to rotate said boost pump about said pivotal mounting whereby to urge said sprocket toward said drive means to increase said drive engaging forces as said torque producing forces increase.

12. The hydraulic drive system of claim 11 wherein said further means for providing variable drive engaging forces also include a hydraulic actuator connected to said boost pump for exerting moment forces thereon, said hydraulic actuator being connected to said supply line such that said hydraulic actuator effects engagement between said drive means and said pump drive sprocket in response to fluid pressure in said supply line, and means for retracting said hydraulic actuator in response to a selected drop in said fluid pressure to disengage said pump drive sprocket from said drive means whereby said boost pump is connected to said drive means when said main source is energized.

13. The hydraulic drive system of claim 12 wherein said agricultural implement is an aircart for an air seeder system, said aircart having a fan and said hydraulic motor being connected to said fan.

14. The hydraulic drive system of claim 7 wherein said drive for said boost pump includes a power take-off connection whereby said boost pump is driven at speeds dependent on the speed of a main drive engine.

15. An aircart for an air seeder system comprising:
    a wheeled frame for movement over the ground;
    a material supply tank mounted on said tank to retain a supply of material to be distributed to the ground;
    a fan rotatably supported on said flame to create a flow of air;
    conduits operably associated with said fan to receive said flow of air and operably connected to said tank to receive quantities of said material for entrainment into said air flow within said conduits for delivery of said quantities of material to a distribution mechanism for distributing said material to the ground;

a hydraulic drive system for powering the rotation of said fan including:

a hydraulic motor for powering the rotation of said fan, said hydraulic motor having a high pressure supply line connected to an inlet of said hydraulic motor and a low pressure return line connected to an outlet of said hydraulic motor, said supply and return lines adapted to be connected to a source of hydraulic fluid under pressure; and a boost pump in parallel with said source of hydraulic fluid under pressure for supplementing the output thereof; and a drive for said boost pump including a ground engaging wheel connected via a mechanical drive train to said boost pump whereby said boost pump is driven at speeds dependent on the ground speed of the agricultural machine.

16. The aircart of claim 15 wherein said mechanical drive train includes a pump drive sprocket connected to said boost pump and a drive chain interengaged between said pump drive sprocket and said ground engaging wheel to effect rotation of said pump drive sprocket upon rotation of said ground engaging wheel, and further means for providing variable drive engaging forces to prevent slippage of said drive chain relative to said sprocket, which drive engaging forces are reduced during off-peak loads to reduce wear between said sprocket and said drive chain.

17. The aircart of claim 15 wherein said further means for providing variable drive engaging forces include a pivotal mounting for said boost pump arranged and located such that torque-producing forces exerted on said sprocket by said drive chain create moment forces on said boost pump tending to rotate said boost pump about said pivotal mounting whereby to urge said sprocket toward said drive chain to increase said drive engaging forces as said torque producing forces increase; and a hydraulic actuator connected to said boost pump for exerting moment forces thereon, said hydraulic actuator being connected to said supply line such that said hydraulic actuator effects engagement between said drive chain and said pump drive sprocket in response to fluid pressure in said supply line, and means for retracting said hydraulic actuator in response to a selected drop in said fluid pressure to disengage said pump drive sprocket from said drive chain.

18. In an aircart for an air seeder system having a hydraulic drive system including a hydraulic motor for driving a load, a supply line connected to an inlet of said hydraulic motor, and a hydraulic pump operatively connected to said hydraulic motor via said supply line, a drive for said hydraulic pump comprising:

a ground engaging wheel connected via a mechanical drive train to said hydraulic pump whereby said hydraulic pump is driven at speeds dependent on the ground speed of the aircart, said mechanical drive train including a pump drive sprocket connected to said hydraulic pump and a drive means engaging said sprocket to effect rotation of same on rotation of said ground engaging wheel; and further means for providing variable drive engaging forces to prevent slippage of said drive means relative to said sprocket, which drive engaging forces are reduced during off-peak loads to reduce wear between said sprocket and said drive means.

19. The aircart of claim 18 wherein said further means for providing variable drive engaging forces include a pivotal mounting for said hydraulic pump arranged and located such that torque-producing forces exerted on said sprocket by said drive means create moment forces on said hydraulic pump tending to rotate said hydraulic pump about said pivotal mounting whereby to urge said sprocket toward said drive means to increase said drive engaging forces as said torque producing forces increase.

20. The aircraft of claim 19 wherein said further means for providing variable drive engaging forces also include a hydraulic actuator connected to said hydraulic pump for exerting further moment forces thereon, said hydraulic actuator being connected to said supply line such that said hydraulic actuator effects engagement between said drive means and said pump drive sprocket in response to fluid pressure in said supply line, and means for retracting said hydraulic actuator in response to a selected drop in said fluid pressure to disengage said pump drive sprocket from said drive means whereby said hydraulic pump is connected to said drive means when said main source is energized.

\* \* \* \* \*